United States Patent Office 3,442,963
Patented May 6, 1969

3,442,963
DEHYDRATION OF ALPHA METHYLBENZYL
ALCOHOL TO STYRENE
Ernest I. Korchak, Hackensack, N.J., assignor to Halcon
International, Inc., a corporation of Delaware
No Drawing. Filed May 24, 1967, Ser. No. 640,818
Int. Cl. C07c 15/10
U.S. Cl. 260—669  3 Claims

ABSTRACT OF THE DISCLOSURE

This invention relates to the vapor phase dehydration of methylbenzyl alcohol to form styrene. More specifically the invention relates to a novel dehydration technique whereby the conversion of alpha methylbenzyl alcohol to styrene can be increased and the conversion of alcohol to undesirable byproducts can be decreased by conducting the reaction in the presence of phenol having a partial pressure in the range of 0.01 to 5 p.s.i. in the dehydration reactor.

Background of the invention

The dehydration of alcohols to their corresponding unsaturated structural compounds is well known in the art. This technique has not been used as extensively in the manufacture of styrene as the standard ethylbenzene dehydrogenation since the latter is a more economic technique compared to the former route which proceeded through acetophenone as an intermediate. More recently, however, processes for the manufacture of epoxide compounds have been developed which employ aralkylhydroperoxide compounds as reactants to donate oxygen atoms to olefinic substrates. Such processes, e.g., the formation of propylene oxide by the reaction of propylene with alpha methylbenzyl hydroperoxide produce, as the reduction product of the hydroperoxide, the corresponding alcohol, e.g., alpha methylbenzyl alcohol. The alcohol may be hydrogenated to form the original aralkyl compound from which the hydroperoxide was prepared or it may be dehydrated to form the corresponding unsaturated compound, e.g., styrene. In such latter processes, the art is faced with a need to develop more efficient dehydration techniques. The present invention is concerned with an improved dehydration of alpha methylbenzyl alcohol to styrene.

The dehydration takes place in the vapor phase at temperatures generally between 200 and 400° C. and at pressures between 0 and 100 p.s.i.g. Thermal, noncatalytic dehydrations are possible at temperatures between 300 and 400° C. but best results are obtained over metal oxide catalysts such as titanium, thorium or aluminum oxide at temperatures between 200 and 300° C. and at pressures between 0 and 25 p.s.i.g.

The problems encountered in the dehydration are not unlike those in other organic reactions; it is difficult but economically desirable to maximize the conversion per reactor pass of alpha methylbenzyl alcohol to styrene while limiting the formation of undesirable by-products which cause loss in overall yield and great expense in the separation and purification schemes which must be provided to manufacture a satisfactory product. In the dehydration reaction under discussion the principal byproducts formed are ethylbenzene and higher boiling residues which may contain some polymerized matter. The higher boiling residues contain from 10 to 30% of di(alphamethylbenzyl)-ether which may be recovered from the crude styrene and hydrogenated to ethylbenzene. This recovery process is relatively expensive, however, and it is preferable to avoid forming the ether or to discard minor amounts which are formed.

The ethylbenzene byproduct can be distilled from the styrene product and recovered but the recovery cost is high due to the closeness in boiling points of ethylbenzene and styrene and it is therefore desirable to minimize the amount of ethylbenzene which is formed. The higher boiling residues referred to hereinafter as high boilers are more easily separated from the styrene and discarded but represent a loss in overall process yield. It is also desirable to convert as much of the alcohol as possible in each reactor pass as alcohol separation from the styrene product and recycle to the dehydration reactor add considerable additional expense. Heretofore, however, the conversion of alcohol has been limited by temperature consideration; at higher temperatures, 300 to 400° C., the formation of ethylbenzene increases; at lower temperatures, 150 to 225° C., the formation of high boilers increases. At more optimum temperatures and reactant space velocities the conversion of alcohol per pass is 25 to 99%.

It is the primary purpose of this invention to improve the process for dehydrating alpha methylbenzyl alcohol to styrene.

This purpose is in part to improve the conversion per pass of alcohol to styrene; it is in further part to reduce the formation of undesirable higher boiling byproducts.

Summary

It has now been discovered that these objects are achieved by the presence of phenol in the vapor feed mixture being fed to the dehydration reactor. It has been found that a phenol partial pressure of desirably 0.01 to 5 p.s.i.a. and preferably 0.05 to 3 p.s.i.a. results in increased alcohol conversions, and decreased ethylbenzene and high boiler formation.

Preferred embodiments

In order to more clearly describe the invention, reference is made to the following examples which show the effects of phenol partial pressure upon the three critical operating criteria discussed above.

Example 1

The dehydration of alpha methylbenzyl alcohol to styrene was studied in a ½ inch tubular reactor. The reactor material was 403 stainless steel and it was filled with ⅓ inch pelletized titanium oxide (TiO$_2$) catalyst (Titanox anatase). The catalyst bed was 25 cc. and was preceded by a layer of glass beads which served to vaporize the material fed to the reactor. The feed mixture consisted of about 80 parts (by weight) alpha methylbenzyl alcohol and 20 parts acetophenone which is a common compound in the overall process scheme described briefly above. The feed mixtures contained varying amounts of phenol and water and were refluxed to remove dissolved air. Nitrogen was used as a diluent for the reaction. The results are set out in Table I.

TABLE I

| Run | Temp., °C. | LSHV | MBA | Partial Pressure, p.s.i.a. Phenol | H₂O | ACP | N₂ | Pressure, p.s.i.a. | Conv., percent | EB/EB plus Sty., percent | HB Selec., percent | Sty. Selec., percent |
|---|---|---|---|---|---|---|---|---|---|---|---|---|
| 1 | 260 | 2.00 | 4.52 | 0.152 | 0 | 1.26 | 8.76 | 14.7 | 77.5 | 0.39 | 5.5 | 94.1 |
| 2 | 260 | 2.12 | 7.47 | 0.252 | 3.95 | 2.08 | 0.95 | 14.7 | 91.5 | 0.17 | 7.4 | 92.4 |
| 3 | 260 | 2.00 | 7.70 | 0.259 | 0 | 2.14 | 4.60 | 14.7 | 91.5 | 0.17 | 6.3 | 93.5 |
| 4 | 260 | 2.24 | 4.73 | 0.159 | 5.00 | 1.315 | 3.50 | 14.7 | 81.5 | 0.24 | 6.6 | 93.1 |
| 5 | 260 | 2.00 | 4.52 | 0.152 | 0 | 1.26 | 8.76 | 14.7 | 78.5 | 0.20 | 5.4 | 94.5 |
| 6 | 279 | 2.00 | 4.52 | 0.152 | 0 | 1.26 | 8.76 | 14.7 | 82.5 | 0.35 | 6.0 | 93.6 |
| 7 | 280 | 2.27 | 4.57 | 0.154 | 5.32 | 1.27 | 3.38 | 14.7 | 84 | 0.35 | 4.9 | 94.7 |
| 8 | 280 | 2.00 | 7.70 | 0.259 | 0 | 2.14 | 4.60 | 14.7 | 88.5 | 0.53 | 15.6 | 83.9 |
| 9 | 280 | 2.13 | 7.40 | 0.249 | 4.05 | 2.06 | 0.94 | 14.7 | 94 | 0.42 | 6.0 | 93.6 |
| 10 | 260 | 2.00 | 4.52 | 0.152 | 0 | 1.26 | 8.76 | 14.7 | 71.5 | 0.35 | 5.1 | 94.5 |
| 11 | 280 | 2.00 | 4.50 | 0.152 | 0 | 1.29 | 8.76 | 14.7 | 72.5 | 0.58 | 5.7 | 93.7 |
| 12 | 280 | 2.24 | 4.70 | 0.159 | 5.00 | 1.345 | 3.50 | 14.7 | 83 | 0.45 | 4.6 | 94.9 |
| 13 | 279 | 2.00 | 4.56 | 0 | 0 | 1.35 | 8.79 | 14.7 | 76 | 0.63 | 4.75 | 94.6 |
| 14 | 280 | 2.24 | 4.76 | 0 | 5.01 | 1.41 | 3.51 | 14.7 | 71.5 | 1.1 | 6.6 | 92.3 |
| 15 | 280 | 2.00 | 7.80 | 0 | 0 | 2.31 | 4.64 | 14.7 | 81.5 | 0.78 | 7.8 | 91.4 |
| 16 | 281 | 2.13 | 7.48 | 0 | 4.06 | 2.22 | 0.945 | 14.7 | 81.5 | 0.77 | 6.2 | 94.0 |
| 17 | 260 | 2.00 | 4.55 | 0 | 0 | 1.35 | 8.70 | 14.7 | 46.4 | 0.48 | 6.5 | 92.9 |
| 18 | 260 | 2.24 | 4.76 | 0 | 5.01 | 1.41 | 3.51 | 14.7 | 47 | 2.4 | 4.6 | 92.9 |
| 19 | 260 | 2.00 | 7.80 | 0 | 0 | 2.31 | 4.64 | 14.7 | 61 | 0.84 | 11.6 | 87.5 |
| 20 | 260 | 2.12 | 7.54 | 0 | 3.97 | 2.24 | 0.951 | 14.7 | 65.3 | 0.402 | 9.43 | 90.2 |
| 21 | 260 | 2.00 | 4.50 | 0.152 | 0 | 1.29 | 8.76 | 14.7 | 55.8 | 0.402 | 10.4 | 89.2 |
| 22 | 279 | 2.00 | 7.69 | 0.260 | 0 | 2.145 | 4.615 | 14.7 | 88.6 | 0.606 | 6.05 | 93.4 |
| 23 | 261 | 2.24 | 4.76 | 0 | 5.01 | 1.41 | 3.51 | 14.7 | 67.7 | 0.92 | 8.24 | 90.9 |
| 24 | 280 | 2.24 | 4.48 | 0.437 | 4.99 | 1.32 | 3.48 | 14.7 | 81.9 | 0.79 | 8.14 | 91.1 |
| 25 | 260 | 2.00 | 4.50 | 0.152 | 0 | 1.29 | 8.76 | 14.7 | 79.4 | 0.55 | 5.58 | 93.9 |
| 26 | 260 | 2.00 | 4.50 | 0.152 | 0 | 1.29 | 8.76 | 14.7 | 82.3 | 0.52 | 6.05 | 94.4 |
| 27 | 260 | 2.04 | 4.55 | 0.154 | 0 | 1.30 | 8.69 | 14.7 | 82.3 | 0.52 | 6.1 | 94.4 |
| 28 | 280 | 2.00 | 7.69 | 0.26 | 0 | 2.15 | 4.62 | 14.7 | 95.8 | 0.94 | 6.1 | 93.0 |
| 29 | 280 | 2.24 | 7.10 | 0.935 | 0 | 2.26 | 4.40 | 14.7 | 90.6 | 0.89 | 6.0 | 93.2 |
| 30 | 281 | 2.00 | 7.69 | 0.26 | 0 | 2.15 | 4.62 | 14.7 | 92.5 | 0.83 | 5.6 | 93.6 |
| 31 | 280 | 2.40 | 6.80 | 1.30 | 0 | 2.26 | 4.34 | 14.7 | 92.6 | 0.81 | 7.0 | 92.2 |
| 32 | 280 | 2.00 | 7.56 | 0.258 | 0 | 2.12 | 4.75 | 14.7 | 92.4 | 0.88 | 5.5 | 93.7 |
| 33 | 280 | 2.24 | 4.74 | 0.620 | 0 | 1.51 | 7.85 | 14.7 | 88 | 0.77 | 5.6 | 93.6 |
| 34 | 280 | 2.00 | 5.00 | 0.169 | 0 | 1.40 | 8.14 | 14.7 | 89.5 | 0.91 | 4.0 | 95.1 |
| 35 | 280 | 2.40 | 4.46 | 0.85 | 0 | 1.49 | 7.90 | 14.7 | 89.2 | 0.87 | 5.3 | 93.9 |
| 36 | 280 | 2.00 | 5.00 | 0.169 | 0 | 1.40 | 8.14 | 14.7 | 85.8 | 0.63 | 3.9 | 95.5 |
| 37 | 280 | 2.24 | 4.26 | 1.41 | 0 | 1.58 | 7.45 | 14.7 | 94.3 | 0.56 | 6.0 | 93.4 |
| 38 | 260 | 2.00 | 5.00 | 0.169 | 0 | 1.40 | 8.14 | 14.7 | 93.9 | 0.47 | 5.3 | 94.2 |
| 39 | 240 | 2.00 | 5.00 | 0.169 | 0 | 1.40 | 8.14 | 14.7 | 90.4 | 0.28 | 8.0 | 91.7 |
| 40 | 300 | 2.00 | 5.00 | 0.169 | 0 | 1.40 | 8.14 | 14.7 | 93.2 | 1.47 | 3.9 | 94.5 |
| 41 | 260 | 2.00 | 9.41 | 0.381 | 0 | 2.61 | 17.61 | 30 | 91.5 | 0.20 | 8.7 | 91.1 |
| 42 | 260 | 2.00 | 15.70 | 0.528 |  | 4.40 | 9.38 | 30 | 97.5 | 0.17 | 10.4 | 89.4 |
| 43 | 260 | 2.24 | 11.42 | 0.384 | 12.10 | 3.17 | 2.97 | 30 | 84 | 0.20 | 4.8 | 95.0 |

LHSV=Liquid hourly space velocity, hr.⁻¹ (volume of feed as liquid per volume of catalyst per hour).
MBA=alpha methyl benzyl alcohol.
EB=ethylbenzene.
ACP=acetophenone.
Conv.=mols alcohol converted/mols alcohol fed.
EB/EB & Sty.=100×mols ethylbenzene formed/mols ethylbenzene and styrene formed.
HB Selec.=High boiler selectivity: Mols alcohol converted to high boilers/mols alcohol reacted.
Sty. Selec.=Styrene selectivity: Mols styrene formed/mols alcohol reacted.

Example 2

Dehydrations were carried out in a 316 S.S. tube containing no catalyst. The compositions of the feed gases are expressed in volume percent and the headings are as in Table I.

TABLE II

| Run | Feed Composition, Vol. Percent MBA | ACP | Phenol | Liquid Flowrate, cm.³/hr. | Mol Ratio, Feed/N₂ | Temp., °C. | Conv. Percent | EB Selec., Percent | HB Selec., Percent |
|---|---|---|---|---|---|---|---|---|---|
| 44 | 75.8 | 22.0 | 2.2 | 100 | 2 | 198–207 | 3.6 | 0 | 17.5 |
| 45 | 75.8 | 22.0 | 2.2 | 100 | 2 | 251–268 | 5.9 | 0 | 24.5 |
| 46 | 75.8 | 22.0 | 2.2 | 100 | 2 | 314–318 | 11.4 | 0 | 26.2 |
| 47 | 81.4 | 18.6 | 0.0 | 100 | 2 | 202–206 | 0.8 | 0 | 41.9 |

Example 3

Dehydrations were carried out in a 316 S.S. tube packed with glass beads. The results are shown in Table III.

What is claimed is:

1. In a process for the production of styrene by the vapor phase dehydration of alpha methylbenzyl alcohol at temperatures between 200 and 400° C. and at pressures between 0 and 100 p.s.i.g., the improvement which comprises the presence of phenol having a partial pressure of from 0.01 to 5 p.s.i. in the feed to the dehydration reactor.

TABLE III

Temperature=260° C. (except where indicated otherwise)
MBA/N₂=2 (molar ratio of feed to N₂)

| Run | Packing | Feed Composition, Percent Phenol | MBA | ACP | LHSV=0.25 Conv., Percent | HB Sel., Percent | Percent EB/EB Plus Sty. | LHSV=0.1 Conv., Percent | HB Sel., Percent | Percent EB/EB Plus Sty. |
|---|---|---|---|---|---|---|---|---|---|---|
| 48 | 3 mm. lime glass beads | 2.1 | 75.8 | 22.1 | 99.6 | 4 | 0.25 |  |  |  |
| 49 | 3 mm. glass beads | 2.1 | 75.8 | 22.1 | 90.8 | 3.5 | 0.11 |  |  |  |
| 50 | do | 0 | 81.4 | 18.6 | 27.3 | 14.6 | 2.6 | 59.2 | 5.8 |  |
| 51 | do | 0 | 98.5 | 0 | 13.2 | 23.0 | 1.8 | 64.3 | 7.2 | 0.36 |
| 52 | do | 2.0 | 97.0 | 0 | 30.1 | 15.8 | 0.43 | 59.2 | 13.5 | 0.74 |
| 53 | do | 0.5 | 80.0 | 19.5 | 27.9 | 20.2 | 1.42 | 68.0 | 9.5 | 0.36 |
| 54 | do | 2.1 | 75.8 | 22.1 | 23.1 | 21.6 | 0 |  |  |  |
| 55 | do | 1.8 | 77.1 | 21.0 | 41.6 | 13.8 | 0.55 | 78.6 | 8.6 | 0.08 |
| 56 | As above but at T=275° C | | | | | | | 94.9 | 4.7 | 0.28 |

2. The process of claim 1 wherein partial pressure of phenol is between 0.05 and 3 p.s.i.

3. In a process for the production of styrene by the catalytic vapor phase dehydration of alpha methylbenzyl alcohol wherein a feed gas containing alpha methylphenyl alcohol is passed through a catalytic dehydration zone at a temperature of 240–280° C., and a pressure of 0 to 50 p.s.i.g. and a space velocity of 50 to 5000 hr.$^{-1}$ the improvement which comprises maintaining a partial pressure of phenol in the dehydration feed gas between 0.01 and 5 p.s.i., and separating styrene from the product formed.

References Cited

FOREIGN PATENTS 778,947  7/1957  Great Britain.

DELBERT E. GANTZ, *Primary Examiner.*

CURTIS R. DAVIS, *Assistant Examiner.*